United States Patent

Cassidy et al.

Patent Number: 4,918,153
Date of Patent: Apr. 17, 1990

[54] COPOLY(IMIDINE-AMIDE)

[76] Inventors: Patrick E. Cassidy, 6102 Bend O'River Dr., Austin, Tex. 78746; James M. Farley, 2795 Pinewood, League City, Tex. 77573; Maryanne Mores, 235 May St., Manhattan, Ill. 60442

[21] Appl. No.: 323,594

[22] Filed: Mar. 14, 1989

[51] Int. Cl.$^4$ .................. C08G 8/02; C08G 14/00
[52] U.S. Cl. ................................ 528/125; 528/126; 528/353; 528/350; 528/354
[58] Field of Search ............... 528/125, 126, 353, 350, 528/354

[56] References Cited

FOREIGN PATENT DOCUMENTS 56-10530  2/1981  Japan.
59-47745  3/1984  Japan.

OTHER PUBLICATIONS

Mitsuru Ueda, et al., "Synthesis of Polybenzodipyrrolediones by Thermal Cyclodehydration of Polyamides Derived from Dibenzylidenebeneodifurandiones and Aliphatic Diamines", Journal of Polymer Science, vol. 14, 591–602 (1976).

Patrick E. Cassidy, et al., "Polyimidines, A New Class of Polymers, I. Phenylated Polypyromellitimidines", Journal of Polymer Science, vol. 14, 1485–1493 (1976).

Yoshio IMAI, et al., "Synthesis of Benzylidene–Pendant Polyphthalimidines from Flexible Bisphthalides and Various Diamines"; Journal of Polymer Science, vol. 21, 1241–1249 (1983).

Journal of Polymer Science: Synthesis of Polybenzodipyrrolediones by Thermal Cyclodehydration of Polyamides Derived from Dibenzylidenebenzodifurandiones and Aliphatic Diamines; Author: Ueda, Takahashi and Imai; vol. 14, 591–602.

Direct Synthesis and Properties of Polybenzodipyrrolediones from Dibenzylidenebenzodifurandiones and Various Diamines; Author: Udea, Takahashi; vol. 14, 2391–2397.

Polyimidines, A New Class of Polymers. Author: Cassidy and Syrinek vol. 14, 1485–1493.

Primary Examiner—John Kight
Assistant Examiner—M. L. Moore

[57] ABSTRACT

The present invention relates to a copoly(imidineamide) consisting of a copolymer of polyamidines and polyimides having, in the basic chain structure of the polymer, imidine structures represented by formula [I] and the amide structures represented by formula [II]:

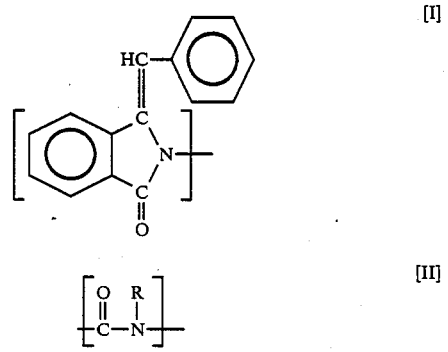

The copoly(imidine-amide) of the present invention is a polymeric material of excellent heat resistance and processability useful for a wide range of industrial applications.

4 Claims, 1 Drawing Sheet

COPOLY(IMIDINE-AMIDE)

FIELD OF THE INVENTION AND RELATED ART STATEMENT

The present invention relates to a copolymer of polyamides and polyimidines. More specifically, it relates to a novel copoly(imidine-amide) having both practical usability and heat resistance.

The copolymers of polyamides and polyimidines according to the present invention are utilized in various fields, specially as layer insulating materials for LSI, solder-resists, liquid crystal oriented films, various protective films, enamel varnishes, flexible print circuit substrates, etc., in the electric and electronic material fields; as plastic lenses, optical pick-up structures, etc., in the optical field; and as gas separation and purification apparatuses such as medical and industrial oxygen enrichment apparatuses, filter apparatuses such as food or medical water purifiers, gas-liquid separation apparatuses in the separation membrane field; and in heat-resistant adhesives, fibers, and films.

In the prior art, polyamide resins have been used as heat-resistant polymers, and a well-known method for the production thereof is based on the condensation of aromatic dicarboxylic acids and diamines.

On the other hand, polyimidines are polymers developed for eliminating the defects of polyimides, and a process for the production thereof has been reported in the Journal of Polymer Science, Polymer Chemistry Edition, 14, 591–602 (1976); ibid, 14, 1485 (1976); ibid, 14, 1519 (1976); ibid, 14, 2391–2397 (1976).

Furthermore, polyimidine resins have improvements in solubility behavior over normal polyimides which are insoluble or less soluble in many of common solvents. These compounds show superior heat resistance, but it is difficult to obtain a high molecular weight and thus a practical polymer has not been obtained.

Recently, Imai et al reported high molecular weight polyimidine resins in the Journal of Polymer Science, Polymer Chemistry Edition, 21, 1241 1249 (1983). However, this relates to a polyimidine using monomers synthesized through extremely complicated processes, and thus difficult to produce on a commercial scale.

OBJECT AND SUMMARY OF THE INVENTION

It is an object of the present invention to provide novel polymers of high molecular weight and utility as heat-resistant polyimidine resins.

In accordance with the present invention, there is provided a copolymer containing an imidine structure of the general formula [I] and an amide structure of the general formula [II] in the basic chain structure of the polymer:

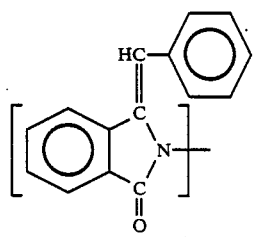

[I]

[II]

The group R in formula [II] denotes hydrogen or a monovalent organic radical and formula [I] denotes at least one group selected from the formula [I-a], [I-b], and [I-c].

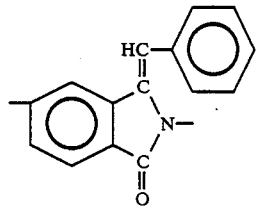

[I-a]

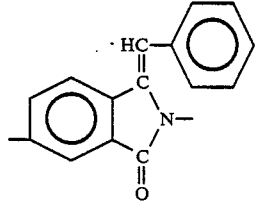

[I-b]

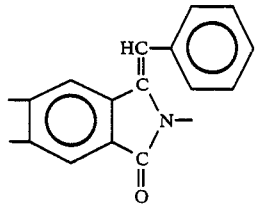

[I-c]

The above-mentioned structures [I-a] and [I-b] can be derived from a monomer prepared from, as a starting substance, a tetracarboxylic dianhydride having two or more rings, e.g., the following compound [III] (i.e., 5,6'-BBB:5,6'-bis(3-benzylidene-3H-benzofuran-2-one)):

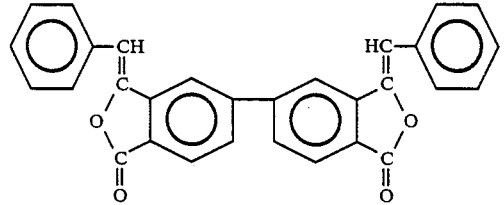

[III]

The above-mentioned structure [I-c] can be derived from a monomer prepared from, as a starting substance, a monocylic or polycyclic aromatic tetracarboxylic dianhydride, e.g., the following compound [IV] (i.e., 3,5-DBP:3,5-dibenzylidene-3,5-dihydro-1H,7H-benzo[1,2-c:4,5-c']difuran-1,7-dione).:

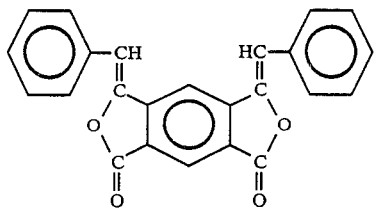

[IV]

Furthermore, the above-mentioned structure [II] can be derived from aromatic dicarboxylic acids or their derivatives such as acid anhydrides or acid halides (e.g., terephthaloyl chloride).

DETAILED DESCRIPTION OF THE PREFERRED EMBODIMENT

Figure 1:
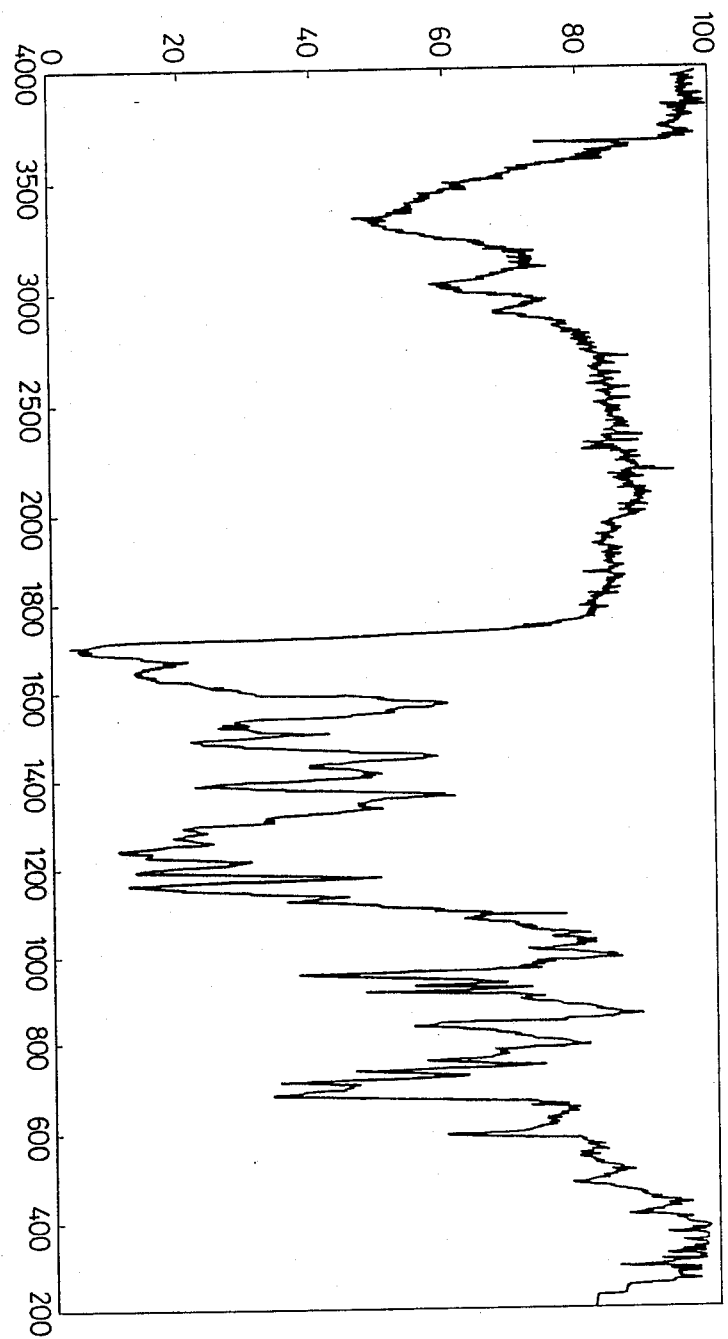
FIG. 1 is a chart of an infra red scan of the copoly(imidine-amide) produced in Example 3.

The present inventors engaged in in-depth studies to eliminate the defects of the prior art mentioned above and, as a result, discovered that, by synthesizing polymers having both imidine structures and amide structures, a superior solubility and a high molecular weight could be simultaneously obtained, and thus they completed the present invention.

The copoly(imidine-amide) according to the present invention may be any of alternating copolymers, random copolymers, block copolymers, or composite copolymers of imidines and amides. The present copoly(imidine-amide) can be obtained by the reaction of at least one each of DBP's (explained below, including DBP, BBB and their derivatives), diamines, and aromatic dicarboxylic acid derivatives at a predetermined ratio to form copoly(hydroxy lactam amide) followed by dehydration.

The compounds herein referred to as "DBP" (dibenzylidenedihydrofurandiones) having the following formulas:

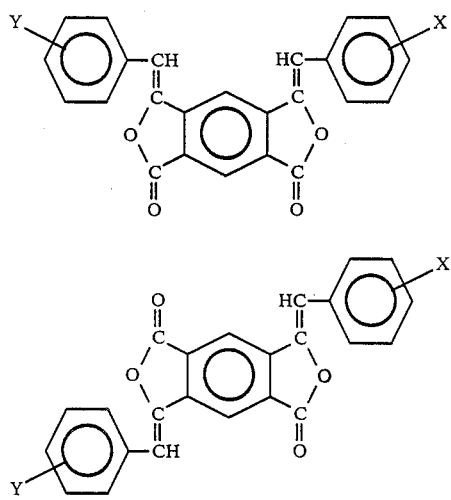

wherein X and Y are independently hydrogen, alkyl, alkoxy, and a halogen.

Typical examples of DBP are 3,5-dibenzylidene-3,5-dihydro-1H, 7H-benzo[1,2-c:4,5-c']difuran-1,7-dione (3,5-DBP) and 3,7-dibenzylidene-3,7-dihydro-1,H, 5H-benzo[1,2-c:4,5-c']difuran-1,5-dione (3,7-DBP).

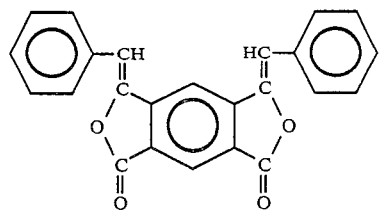

(3,5-DBP)

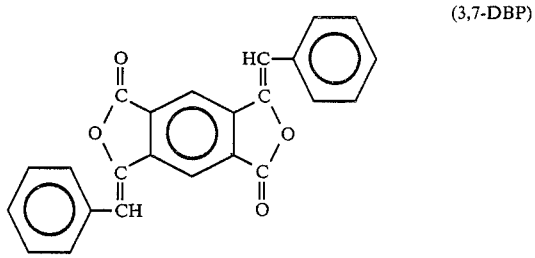

(3,7-DBP)

The diamines usable in the present invention include 1,3-diaminobenzene, 1,4-diaminobenzene, m-xylylenediamine, 4,4'-diaminodiphenyl ether, 2,2-bis(3'-amino-4'methylphenyl)-hexafluoropropane, 2,2-bis(4'-aminophenyl)hexafluoropropane, tetramethylenediamine, and hexamethylenediamine. The aromatic dicarboxylic acids and their derivatives usable in the present invention include o-phthalic acid, isophthalic acid, terephthalic acid, 4,4'-benzophenonedicarboxylic acid, 4,4'-thiodibenzoic acid, 4,4'-sulfonyl-dibenzoic acid, 4,4'-diphenylmethanedicarboxylic acid, 1,2-diphenylethane-4,4'-dicarboxylic acid, 1,1-diphenylethane-4,4'-dicarboxylic acid, 2,2-diphenylpropane-4,4'-dicarboxylic acid, and their derivatives, such as acid chlorides and anhydrides. 2,2-bis(4-chloroformylphenyl)-hexafluoropropane and 2,2-bis(4-chloroformylphenyl)propane may also be included.

Of the above-mentioned compounds, the compounds of preferance used in the present invention include 3,5-DBP as the DBP, m-xylylenediamine and 4,4'-diaminophenyl ether as the diamine, and terephthaloyl chloride, 4,4'-benzophenonedicarboxylic acid chloride, 2,2-bis(4-chloroformylphenyl)-hexafluoropropane, and 2,2-bis(4-chloroformylphenyl)propane as the aromatic dicarboxylic acid or its derivative.

Particularly, preferable combinations of these compounds are as follows:

(a) 3,5-DBP, m-xylylenediamine, and terephthaloyl chloride, (b) 3,5-DBP, m-xylylenediamine, and 4,4'-benzophenonedicarboxylic acid chloride, (c) 3,5-DBP, m-xylylenediamine, and 2,2-bis(4-chloroformylphenyl)hexafluoropropane, (d) 3,5-DBP, 4,4'-diaminodiphenyl ether, and terephthaloyl chloride, (e) 3,5-DBP, 4,4'-diaminodiphenyl ether, and 4,4'-benzophenonedicarboxylic acid chloride, and (f) 3,5-DBP, 4,4'-diaminodiphenyl ether, and 2,2-bis(4-chloroformylphenyl)propane.

The proportion of the above-mentioned monomers used has a remarkable effect on the average molecular weight of the polymer formed. The proportion of the total amount of the DBP and aromatic dicarboxylic acid halides and the amount of the diamines should be 1.8 to 2.2 moles of the latter diamines to 1 mole of the total amount of the former DBP and aromatic dicarboxylic acid halides. By making this proportion almost 2.0, a high molecular weight polymer can be obtained. The proportion of the DBP and aromatic dicarboxylic acid halides should be 0.1 to 10.0 moles, preferably 0.5 to 2.0 moles, of the latter aromatic dicarboxylic acid halides to 1 mole of the former DBP.

Copoly(imidine-amide) can be synthesized, for example, in the following way. Namely, 3,5-DBP and 4,4'-diaminodiphenyl ether in a 2:1 moler ratio are allowed to react in a solvent such as N-methylpyrrolidone at 135° C. for 48 hours. The heating is stopped and an aromatic dicarboxylic acid chloride such as 2,2-bis(4-chloroformylphenyl)-hexafluoropropane is added, and then the reaction is continued at an ambient temperature or a temperature below that for additional 24 hours to obtain a copoly(hydrated imidine-amide). The above-mentioned reaction is desirably performed in a dry, inert atmosphere, and the product is dehydrated by heating above 180° C. under reduced pressure to obtain the desired copoly(imidine-amide). However, the synthetic method is not limited to the one mentioned above, and the reaction conditions and other factors may be suitably modified. As an example, the reartion of 3,5-DBP, 4,4'-diaminodiphenyl ether, and 2,2-bis-(4-chloroformylphenyl)hexafluoropropane is illustrated below.

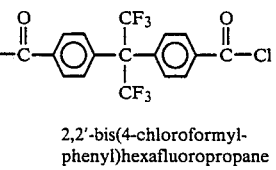

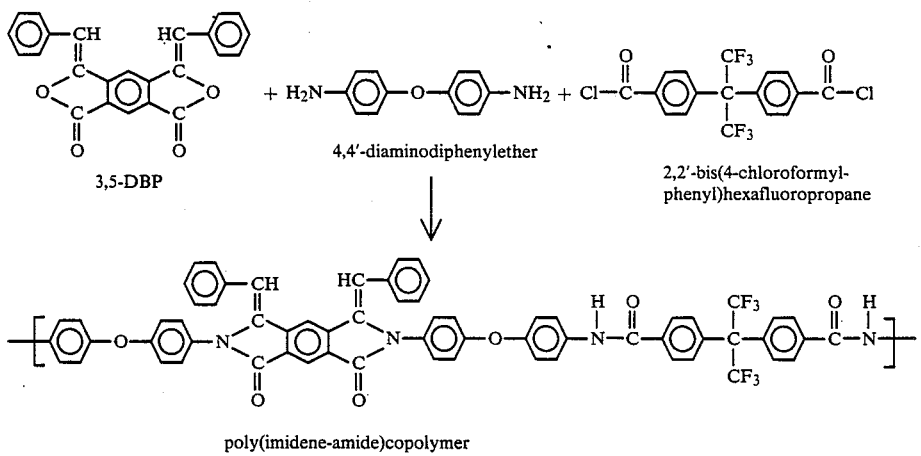

poly(imidene-amide)copolymer

The above-mentioned copoly(imidine-amide) is easy to process as it is soluble in common organic solvents. It shows good film-forming properties when the inherent viscosity ($\eta$ inh) determined in a solution of 0.25 g of the polymer in 100 ml of N-methylpyrrolidone with the aid of an Ostwald viscometer is 0.5 dl/g or more at 25° C. However, the organic solvent used depends on the composition of the polymer in question.

Furthermore, the copoly(imidine-amide) is characterized by excellent heat resistance and shows a temperature for the 10% weight loss of 400° C. or more as determined by a thermogravimetric analyzer.

The copoly(imidine-amide) of the present invention is a polymeric material of excellent heat resistance and processability useful for a wide range of industrial applications; for example, in interlayer insulating materials for LSI's solder resists, liquid crystal oriented films, protective films, enamel varnishes, and flexible printed circuit board materials in the electric and electronic material fields, plastic lenses and optical pick-up structures in the optical fields, oxygen enrichment apparatuses and gas separators and purifiers for medical and industrial use and water purifiers, filters, and gas-liquid separators for food and pharmaceutical use in the separation membrane field, and in heat-resistant adhesives.

[EXAMPLES]

Example 1

In a 50 ml three-necked flask fitted with a stirrer and a reflux condenser were placed 1.0097 g (5 millimoles) of 4,4'-diaminodiphenyl ether (ODA) and 12 ml of N-methylpyrrolidone and stirred in an atmosphere of argon until a solution resulted, 0.9238 g (2.5 millimoles) of 3,5-dibenzylidene-3,5-dihydro-1H,7H-benzo[1,2-c:4,5-c']difuran-1,7-dione (3,5-DBP) was added with stirring, and the mixture was heated at 135° C. for 48 hours with stirring until a yellowish brown solution formed. The solution was cooled to −23° C. in a dry ice-carbon tetrachloride bath, 0.5410 g (1.25 millimole) of 2,2-bis(4-chloroformylphenyl)-hexafluoropropane (6FDAC) was added, stirred thoroughly, and 0.5410 g (1.25 millimole) of 6FDAC was further added in small portions over a period of 2 hours with cooling and stirring. The solvent was added in portions of several milliliters as the viscosity of the solution increased and the solution was stirred for additional 12 hours at room temperature.

The solution was then dispersed in 1 liter of water and the precipitates were collected by filtration and dried at 80° C. under reduced pressure. The yield of a yellowish brown powder was 96%.

The sample was then heated at 200° C. for 24 hours under reduced pressure to yield the desired copoly(imidine-amide), which was submitted to elementary analysis and tested for inherent viscosity, glass transition temperature, and thermal decomposition temperature (temperature for 10% weight loss in an atmosphere of nitrogen). The results are shown below.

Elemental Analysis (%)
Measured Value: C: 71.38, H: 3.71, N: 5.85
Calculated Value: C: 71.82, H: 3.71, N: 5.15
Inherent Viscosity: 0.60 dl/g (in m-Cresol at 25° C.)
Glass Transition Temperature: 290° C.
Thermal Decomposition Temperature: 515° C.
Solubility: N,N-Dimethylformamide, N,N-Dimethylacetamide, N-Methylpyrrolidone, m-Cresol

Example 2

The reaction was carried out as in Example 1 using 0.8025 g (2.5 millimoles) of 2,2-bis(4-chloroformylphenyl)-propane (6HDAC) in place of 6FDAC.

The resulting polymer solution was dispersed in 500 ml of methanol and the precipitates were collected by filtration and dried at 90° C. under reduced pressure to obtain a yellowish brown product in 73% yield.

The powder was then heated at 200° C. for 24 hours under reduced pressure to yield the desired copoly(imidine-amide), which was analyzed and tested as in Example 1. The results are shown below.

Elemental Analysis (%)
Measured Value: C: 77.00, H: 4.60, N: 5.65
Calculated Value: C: 79.73, H: 4.74, N: 5.72
Inherent Viscosity: —(Not measurable due to gelation)
Glass Transition Temperature: —(None observed)
Thermal Decomposition Temperature: 485° C.

Example 3

The reaction was carried out as in Example 1 using m-xylylenediamine (MXDA) in place of ODA and adding triethylamine, in an equimolar quantity to MXDA, to the reaction system before the addition of 6FDAC.

The resulting polymer solution was dispersed in 500 ml of methanol and the precipitates were collected by filtration and dried at 90° C. under reduced pressure to obtain a white powder in 68% yield.

The powder was then heated at 210° C. for 24 hours under reduced pressure to yield the desired copoly(imidine-amide), which was analyzed and tested as in Example 1. The results are shown below.

Elemental Analysis (%)
Measured Value: C: 69.16, H: 4.15, N: 5.67
Calculated Value: C: 71.38, H: 4.21, N: 5.84
Inherent Viscosity: 0.64 (in N-Methylpyrrolidone at 25° C.)
Glass Transition Temperature: 176° C.
Thermal Decomposition Temperature: 425° C.
Solubility: N,N-Dimethylformamide, N,N-Dimethylacetamide, N-Methylpyrrolidone, m-Cresol An IR chart of the obtained copoly(imidine-amide) is shown in FIG. 1.

Example 4

The reaction was carried out as in Example 3 using 6HDAC in place of 6FDAC and holding the reaction mixture at −23° C. for 1 hour and at room temperature for 3 hours.

The resulting polymer solution was dispersed in 500 ml of methanol and the precipitates were collected by filtration and dried at 90° C. under reduced pressure to obtain a white powder in 65% yield.

The powder was heated at 210° C. for 24 hours under reduced pressure to yield the desired copoly(imidine-amide), which was analyzed and tested as in Example 1. The results are shown below.

Elemental Analysis (%)
Measured Value: C: 77.02, H: 5.41, N: 6.36
Calculated Value: C: 80.44, H: 5.46, N: 6.58
Inherent Viscosity: 0.55 (in N-Methylpyrrolidone at 25° C.
Glass Transition Temperature: 199° C.
Thermal Decomposition Temperature: 402° C.
Solubility: N,N-Dimethylformamide, N,N-Dimethylacetamide, N-Methylpyrrolidone, m-Cresol

What is claimed is:

1. A copolymer containing an imidine unit of the general formula [I] and an amide unit of the general formula [II] in the basic chain structure of the polymer:

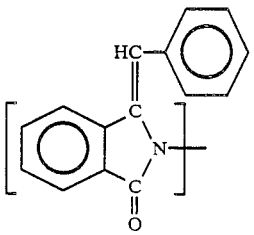

[I]

[II]

wherein R in the general formula [II] denotes hydrogen or a monovalent organic radical.

2. A copolymer according to claim 1, wherein the imidine unit of the general formula [I] consists of at least one unit selected from units of the general formula [I-a], [I-b], and [1-c].

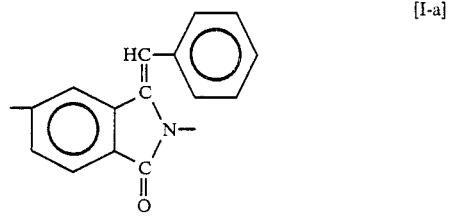

[I-a]

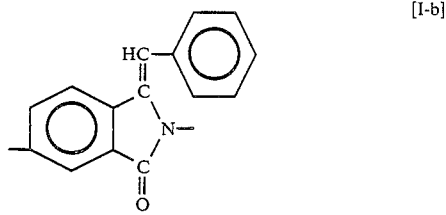

[I-b]

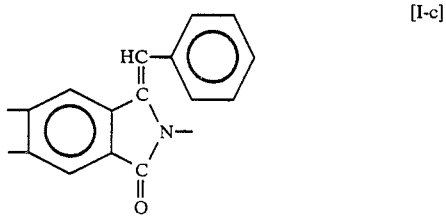

[I-c]

3. A copolymer according to claim 1, wherein the inherent viscosity ($\eta$ inh) of a solution of 0.25 g of the copolymer in 100 ml of N-methylpyrrolidone is 0.50 dl/g or more at 25° C.

4. A copolymer according to claim 1, wherein the copolymer is obtained from dibenzylidenedihydrofurandiones, diamines, and aromatic dicarboxylic acid derivertives.

* * * * *

UNITED STATES PATENT AND TRADEMARK OFFICE
CERTIFICATE OF CORRECTION

PATENT NO. : 4,918,153
DATED : April 17, 1990
INVENTOR(S) : CASSIDY et al.

It is certified that error appears in the above-identified patent and that said Letters Patent is hereby corrected as shown below:

On the cover page, after item [76], the following should appear:
--[73] Assignee: Nippon Steel Chemical Co., Ltd., Tokyo, Japan--;

after "Assistant Examiner -- M. L. Moore" the following should appear;
--Attorney, Agent, or Firm -- Armstrong, Nikaido
Marmelstein, Kubovcik
& Murray--; and in item [57], formula [1] should read:

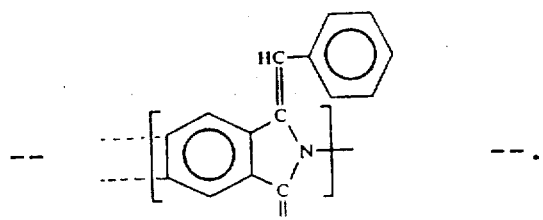

Column 1, lines 58 to 68, the formula should read:

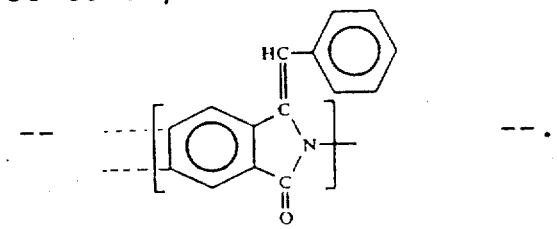

UNITED STATES PATENT AND TRADEMARK OFFICE
CERTIFICATE OF CORRECTION

PATENT NO.   : 4,918,153
DATED        : April 17, 1990
INVENTOR(S)  : CASSIDY et al.

It is certified that error appears in the above-identified patent and that said Letters Patent is hereby corrected as shown below:

Column 8, lines 9 to 19, the formula should read:

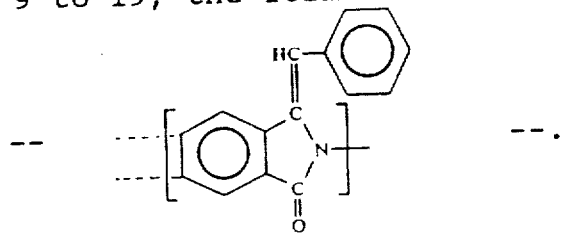

Signed and Sealed this

Ninth Day of July, 1991

Attest:

HARRY F. MANBECK, JR.

Attesting Officer

Commissioner of Patents and Trademarks